US008532804B2

(12) United States Patent
Gimenez

(10) Patent No.: US 8,532,804 B2
(45) Date of Patent: Sep. 10, 2013

(54) PREDICTIVE RESAMPLER SCHEDULER ALGORITHM

(75) Inventor: Alexandre Marciano Gimenez, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 411 days.

(21) Appl. No.: 12/819,052

(22) Filed: Jun. 18, 2010

(65) Prior Publication Data

US 2011/0313553 A1 Dec. 22, 2011

(51) Int. Cl.
*G06F 17/00* (2006.01)

(52) U.S. Cl.
USPC ................................ 700/94; 719/321; 710/53

(58) Field of Classification Search
USPC ........................ 719/321; 710/53, 29; 700/94
See application file for complete search history.

(56) References Cited

U.S. PATENT DOCUMENTS 6,247,072 B1 * 6/2001 Firestone ........................ 710/53
7,620,137 B2 11/2009 Lottis et al. ................... 375/372
7,680,153 B2 3/2010 Ma ................................ 370/503
8,006,007 B1 * 8/2011 Barkana .......................... 710/52
2002/0105951 A1 * 8/2002 Hannuksela et al. ......... 370/389
2003/0026275 A1 * 2/2003 Lanzafame et al. ........... 370/412
2004/0162911 A1 * 8/2004 Sperschneider et al. ...... 709/231
2008/0181259 A1 * 7/2008 Andreev et al. ............... 370/519
2008/0240074 A1 10/2008 Le-Faucheur et al. ........ 370/350
2010/0002683 A1 * 1/2010 Miljkovic et al. ............. 370/352
2010/0077110 A1 3/2010 Berreth ........................... 710/22
2010/0218231 A1 * 8/2010 Frink et al. .................... 725/118

OTHER PUBLICATIONS

Linn, C., et al.; "*Clock Correction Design Considerations in Software Defined Radio Communications Systems*"; 2005; SDR 05 Technical Conference and Product Exposition; accessed at http://www.sdrforum.org/pages/sdr05/1.3%20Circuits%20and%20Chips1/1.3-03%20Linn.pdf.

Wavosaur; "*3.1. Audio Configuration*"; accessed on Apr. 17, 2010 at http://www.wavosaur.com;/quick-help/audio-cofniguration.php.

* cited by examiner

*Primary Examiner* — Fan Tsang
*Assistant Examiner* — David Siegel
(74) *Attorney, Agent, or Firm* — Merchant & Gould

(57) ABSTRACT

A predictive resampler scheduler algorithm may be provided. An audio frame may be received from a producer. The audio frame may be transmitted to a consumer and a delay between receiving the audio frame and transmitting the audio frame may be calculated. In response to determining that the delay comprises a value not within a threshold time range, the size of the audio frame may be modified prior to transmitting the frame to the consumer.

20 Claims, 4 Drawing Sheets

PREDICTIVE RESAMPLER SCHEDULER ALGORITHM

BACKGROUND

A predictive resampler scheduler algorithm is a process for modifying the size of an audio buffer. In some situations, an audio encoder may be operating at a different clock speed from a coupled audio decoder. For example, in an audio provider/consumer environment, every time the producer's clock ticks, a new audio frame has become available. Every time the consumer's clock ticks, it is hungry for one audio frame. In conventional systems, if the producer's clock ticks faster than the consumer's, too much data may accumulate and overrun the consumer's buffers that may result in skips in the audio output. If the producer's clock ticks slower than the consumer's, the consumer will be starved for data and may experience gaps in the audio output.

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

A predictive resampler scheduler algorithm may be provided. An audio frame may be received from a producer. The audio frame may be transmitted to a consumer and a delay between receiving the audio frame and transmitting the audio frame may be calculated. In response to determining that the delay comprises a value not within a threshold time range, the size of the audio frame may be modified prior to transmitting the frame to the consumer.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
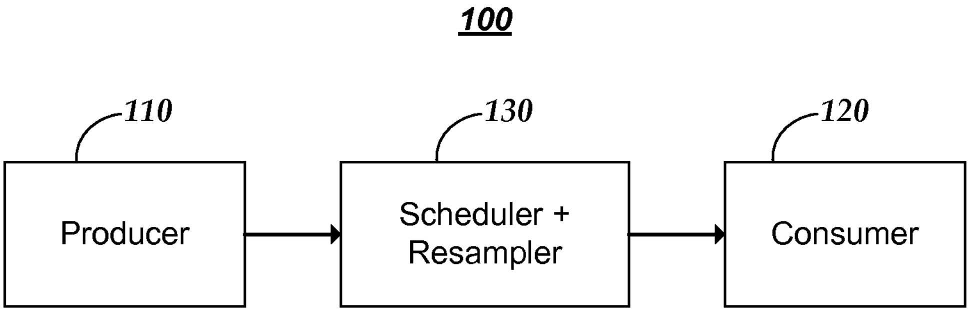
FIG. 1 is a block diagram of an operating environment.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

A predictive resampler scheduler algorithm may be provided. Consistent with embodiments of the present invention, buffer sizes of an audio stream producer and/or consumer may be modified to force a delay between a timer tick of the producer and the consumer to be a known time span. This time span may be referred to herein as the producer-to-consumer delay. The producer-to-consumer delay may be tunable, and may comprise, in some embodiments, half a buffer. During the streaming activity, the resampler scheduler may keep track of a rolling average of the producer-to-consumer delay for the last few buffers. Whenever that rolling average starts to sway in one direction, the resampler scheduler may decide to schedule a resample operation (to stretch or shrink one audio frame) to force the average delay in the opposite direction of the sway. In this manner, the resampler scheduler is predictive, as it forces a correction of clock rate (by resampling buffers) to happen before it significantly affects latency in the stream.

FIG. 1 is a block diagram of an operating environment 100 for providing a resampler scheduler algorithm. Operating environment 100 may comprise an audio stream producer 110, an audio stream consumer 120, and a scheduler resampler utility 130. For example, producer 110 may comprise an audio card in a computer, such as a computing device 400 as described below with respect to FIG. 4, and consumer 120 may comprise an audio output device, such as a set of headphones coupled to the computer via a Universal Serial Bus (USB) connection. The scheduler resampler utility may comprise a software application, service, and/or other process executing on the computer operative to initiate, monitor, modify, halt, and/or otherwise assist in transmitting the audio stream from producer 110 to consumer 120.

Figure 2:
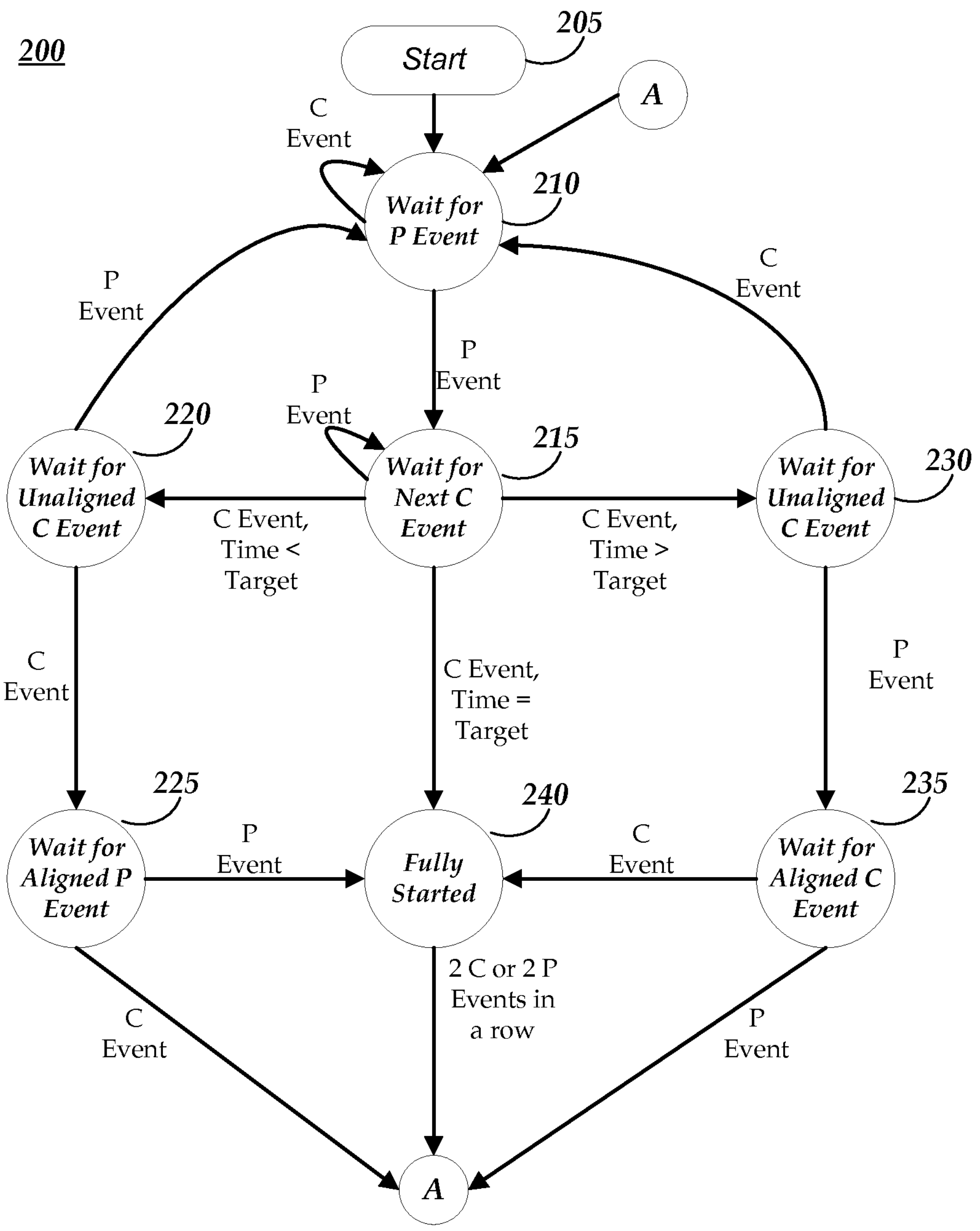
FIG. 2 is a state diagram of a method for initializing a resampler scheduler algorithm.

FIG. 2 is a state diagram setting forth the general stages involved in a method 200 for initializing a resampler scheduler algorithm. Method 200 may be implemented using a computing device 400 as described in more detail below with respect to FIG. 4. Ways to implement the stages of method 200 will be described in greater detail below. Method 200 may begin at starting block 205 and proceed to stage 210 where computing device 400 may begin waiting for a producer event. For purposes of describing method 200, utility 130 may be associated with producer 110. Events associated with producer 110 may be designated on FIG. 2 with "P" and events associated with consumer 120 may be designated on FIG. 2 with "C". Consistent with embodiments of the invention, method 200 may be implemented wherein utility 130 is associated with consumer 120, in which case consumer/producer event designations may be reversed. For example, operating environment 100 may be associated with two components of the same computer, wherein utility 130 may have access to monitor and/or control both producer 110 and consumer 120, such as by pausing and/or restarting a timer clock and/or adjusting a buffer size associated with producer 110 and/or consumer 120. For another example, operating environment 100 may be associated with two separate devices and utility 130 may have control access to only one of producer 110 or consumer 120.

In stage 210, utility 130 may begin waiting for producer 110 to experience a clock tick and/or provide one frame of audio stream data. Consistent with embodiments of the invention, each frame may comprise an amount of audio data that fills an encoding buffer of producer 110 and may be associated with a configurable time duration of the audio stream. For example, each produced frame may comprise 5 ms of audio data. In stage 210, utility 130 may measure the amount of time between successive frame events of producer 110 and/or consumer 120.

If a consumer event (e.g., a clock tick associated with a request for a next data frame) occurs while in stage 210, computing device 400 may remain in stage 210 and wait for a producer event. Consistent with embodiments of the invention, utility 130 may measure the time between consumer clock ticks and/or stop the consumer clock while waiting for a producer event.

When the producer event occurs, method 200 may advance to stage 215 where computing device 400 may begin waiting for a next consumer event. If computing device 400 receives a subsequent producer event while in stage 215, computing device 400 may remain in stage 215.

Otherwise, when a consumer event is received, method 200 may determine how much time passed between the last producer event and the consumer event. For example, while in stage 210, a producer event may occur and method 200 may advance to stage 215. Another producer event may occur 10 ms later, and method 200 may remain in stage 215. A target delay of half the time between producer ticks (e.g., 5 ms) may be established. When a consumer event occurs, utility 130 may determine how much time passed between the consumer event and the previous producer event.

If the time between the consumer event and the previous producer event is less than the target time, method 200 may advance to stage 220 where computing device 400 may transfer a portion of a waiting audio frame. For example, each produced audio frame may comprise 6 ms of data. Half of that time is 3 ms, which may comprise the target time between the producer and consumer ticks. If the consumer tick occurs 2 ms after the producer tick, utility 130 may transfer a portion of the buffer to synchronize the consumer clock. This may be accomplished by transferring an amount of data equal to the target time−the actual time between the ticks (e.g., 3 ms−2 ms=1 ms of data transferred from the waiting frame.) The next consumer tick may then be delayed by the 1 ms of data and may be synchronized to occur at the target time (e.g., 3 ms) after the producer tick. If the next event to be received comprises a producer event, method 200 may return to stage 210 and restart the synchronization.

If the next event to be received comprises the synchronized consumer event, however, method 200 may advance to stage 225 where computing device 400 may wait for the next producer event. The next producer event may comprise an aligned frame based on the target synchronization of the producer and consumer clocks. If the next event to be received is not a producer event, however, method 200 may return to stage 210 and restart the synchronization.

If the time between the consumer event and the previous producer event is greater than the target time, method 200 may advance to stage 230 where computing device 400 may transfer a waiting audio frame and a portion of a next audio frame. For example, each produced audio frame may comprise 10 ms of data. Half of that time is 5 ms, which may comprise the target time between the producer and consumer ticks. If the consumer tick occurs 6 ms after the producer tick, utility 130 may transfer an amount of data equal to a full frame plus the target time minus the actual time between the producer and consumer ticks to synchronize the consumer clock. For example, with a full frame time of 10 ms, a target of 5 ms, and an actual time of 6 ms, utility 130 may transfer audio data equal to ((10+5)−6), or 9 ms. The next consumer tick may then be delayed by the 1 ms of data and may be synchronized to occur at the target time (e.g., 3 ms) after the producer's tick. If the next event to be received comprises a producer event, method 200 may return to stage 210 and restart the synchronization.

If the time between the consumer event and the previous producer event is equal to the target time, method 200 may advance to stage 240 where computing device 400 may enter a synchronized state. Method 200 may also advance to stage 240 if an aligned producer event is received by computing device 400 at stage 225 and/or if an aligned consumer event is received by computing device 400 at stage 235. Once in the synchronized state of stage 240, computing device 400 may transfer each audio frame to consumer 120 as soon as it is received from producer 110.

While in stage 240, if two clock ticks of the same kind occur sequentially (e.g., two producer ticks without an intervening consumer tick or two consumer ticks without an intervening producer ticks), method 200 may return to stage 210 to resynchronize the producer and consumer ticks. If the clock ticks become desynchronized beyond a configurable tolerance, audio frame sizes may be adjusted according to the stages of method 300 described below with respect to FIG. 3. Once the audio stream is completed, method 300 may end at stage 250.

Figure 3:
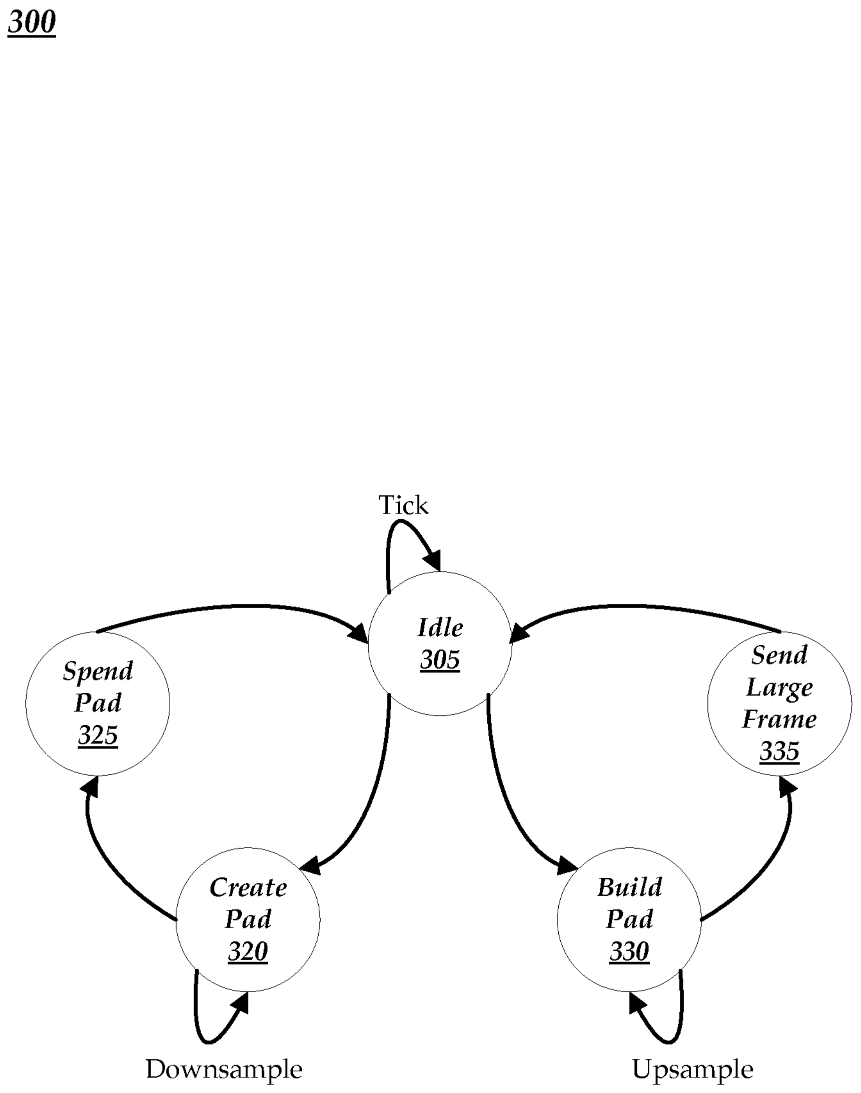
FIG. 3 is a state diagram of a method 300 for scheduling an audio resampling operation.

FIG. 3 is a state diagram setting forth the general stages involved in a method 300 for scheduling an audio resampling operation. Method 300 may be implemented using a computing device 400 as described in more detail below with respect to FIG. 4. Ways to implement the stages of method 300 will be described in greater detail below. Method 300 may begin at stage 305 where computing device computing device 400 may be in an idle state. Consistent with embodiments of the invention, computing device 400 may enter the idle state of stage 305 after performing the initial synchronization of method 200, described above.

While in stage 305, computing device 400 may receive a frame of data from a producer and send the frame of data to a consumer. Utility 130 may calculate a rolling average comprising a delay time between each producer tick, associated with receiving a frame of data from producer 110, and a subsequent consumer tick, associated with providing the frame of data to consumer 120. So long as the average tick delay remains within a threshold of half a frame after the producer tick, method 300 may remain in stage 305. For example, each frame may comprise 10 ms of data and the threshold may comprise 1 ms. If the average tick delay remains between 4 ms and 6 ms, method 300 may remain in the idle state of stage 305 and continue sending frames unchanged to consumer 120 as they are received from producer 110.

If, in stage 305, the tick delay exceeds over the threshold, method 300 may advance to stage 320 where computing device 400 may begin spending a buffer pad to bring the average tick delay back into the threshold range. Utility 130 may schedule consumer 120 to tick earlier than normal so as to consume less of a full frame. For example, utility 130 may transmit 90% of a frame received from producer 110 to consumer 120 and store the remaining 10% of the frame in a "pad". The remaining data may be stored in a memory buffer and may increase transmission latency.

From stage 320, method 300 may advance to stage 325 where computing device 400 may begin consuming the pad. For example, when the pad comprises 10% of a previous frame, the next 10 audio frames from producer 110 may be resampled to reduce their size and make room for 1/10th of the data in the pad. In this state, each frame sent to consumer 120 may comprise original audio shrunk to 99% of its original size, plus 1% of a frame from the pad. Once the pad is fully spent (i.e., all of the buffered data has been transmitted), method 300 may return to stage 305 and re-enter the idle state.

If, in stage 305, the tick delay drops below the threshold, method 300 may advance to stage 330 where computing device 400 may begin building a buffer pad to bring the average tick delay back into the threshold range. For example, for the next 10 audio frames, utility 130 may be upsampled to create a frame of data 101% the size of a regular frame. A data frame equal to a regular frame may be transmitted to consumer 120 and the extra 1% may be stored in the memory buffer pad. This may be repeated as necessary (e.g., creating a pad greater than 10% of a frame) to provide a sufficient amount of data to bring the tick delay back into the threshold range.

Once the pad is prepared in stage 330, method 300 may advance to stage 335 where computing device 400 may use the pad to transmit a larger than normal frame. For example, utility 130 may schedule consumer 120 to tick later than normal so as to consume more then a full frame, such as by transmitting a frame 110% the size of a regular frame (i.e., one regular frame plus the 10% of a frame's worth of data stored in the pad). Method 300 may then return to stage 305 and re-enter the idle state.

From stage 320, method 300 may advance to stage 325 where computing device 400 may begin consuming the pad. For example, when the pad comprises 10% of a previous frame, the next 10 audio frames from producer 110 may be resampled to reduce their size and make room for 1/10th of the data in the pad. In this state, each frame sent to consumer 120 may comprise original audio shrunk to 99% of its original size, plus 1% of a frame from the pad. Once the pad is fully spent (i.e., all of the buffered data has been transmitted), method 300 may return to stage 305 and re-enter the idle state.

Consistent with embodiments of the invention, various factors may comprise configurable variables. For example, although 10% is used above, the amount by which to correct in either direction (e.g., stretch or shrink) and/or the number of frames to spread the stretching/shrinking may be configurable. A throttle constant may also be configured to a value, "N", such that only every Nth frame is stretched or shrunk.

An embodiment consistent with the invention may comprise a system for providing audio stream scheduling. The system may comprise a memory storage and a processing unit coupled to the memory storage. The processing unit may be operative to receive audio frames from a producer, receive a plurality of frame requests from a consumer, and calculate a delay between receiving the audio frame and transmitting the audio frame, and determine whether the delay comprises a value within a threshold range. In response to determining that the delay comprises a value not within the threshold range, the processing unit may be further operative to modify the size of the audio frame prior to transmitting the frame to the consumer.

Another embodiment consistent with the invention may comprise a system for providing audio frame scheduling. The system may comprise a memory storage and a processing unit coupled to the memory storage. The processing unit may be operative to receive a first frame from a producer, receive a second frame from the producer, measure a time between the first frame and the second frame, receive a frame request from a consumer, and determine whether the frame request occurred within a threshold range of a target delay from a time the second frame was received. In response to determining that the frame request did not occur within the threshold range of the target delay, the processing unit may be further operative to modify a size of the first frame and transmit the modified first frame to the consumer.

Yet another embodiment consistent with the invention may comprise a system for providing audio frame resampling and scheduling. The system may comprise a memory storage and a processing unit coupled to the memory storage. The processing unit may be operative to receive a first frame from a producer, receive a second frame from a producer, measure a time between the first frame and the second frame, establish a delay target equal to half the time between the first frame and the second frame, receive a frame request from a consumer, and determine whether the frame request was received before a threshold range of the target delay from a time the second frame was received. In response to determining that the frame request was received before the threshold range of the target delay, the processing unit may be operative to send a portion of the first frame comprising a first amount of data comprising the target delay minus an actual time between receiving the second frame and receiving the frame request to the consumer. The processing unit may be further operative to determine whether the frame request was received after the threshold range of the target delay from the time the second frame was received and, in response to determining that the frame request was received after the threshold range of the target delay from the time the second frame was received, send the first frame and a portion of the second frame to the consumer as a single frame, wherein the single frame comprises a second amount of data comprising a full frame plus the target delay minus an actual time between receiving the second frame and receiving the frame request.

The processing unit may be operative to receive audio frames from a producer, receive a plurality of frame requests from a consumer, calculate a delay between receiving the audio frame and transmitting the audio frame, and determine whether the delay comprises a value within a threshold range. In response to determining that the delay comprises a value less than the threshold range, the processing unit may be further operative to remove a subset of data from the corresponding frame prior to transmitting the corresponding frame to the consumer, store the subset of data in a buffer pad, downsample at least one of the plurality of subsequent frames subsequent to the corresponding frame, and add at least a portion of the subset of data in the buffer pad to the downsampled frame. In response to determining that the corresponding one of the plurality of subsequent frame requests was received after the threshold range of the target delay from the time the corresponding frame was received, the processing unit may be further operative to remove a second subset of data from the corresponding frame and each of a subset of the plurality of subsequent frames, upsample the corresponding frame and each of the subset of the plurality of subsequent frames, transmit the upsampled corresponding frame and each of the subset of the plurality of upsampled subsequent frames to the consumer, store the second subset of data in the buffer pad, receive a next subsequent frame from the producer, add the second subset of data from the buffer pad to the next subsequent frame, and transmit the next subsequent frame to the consumer.

Figure 4:
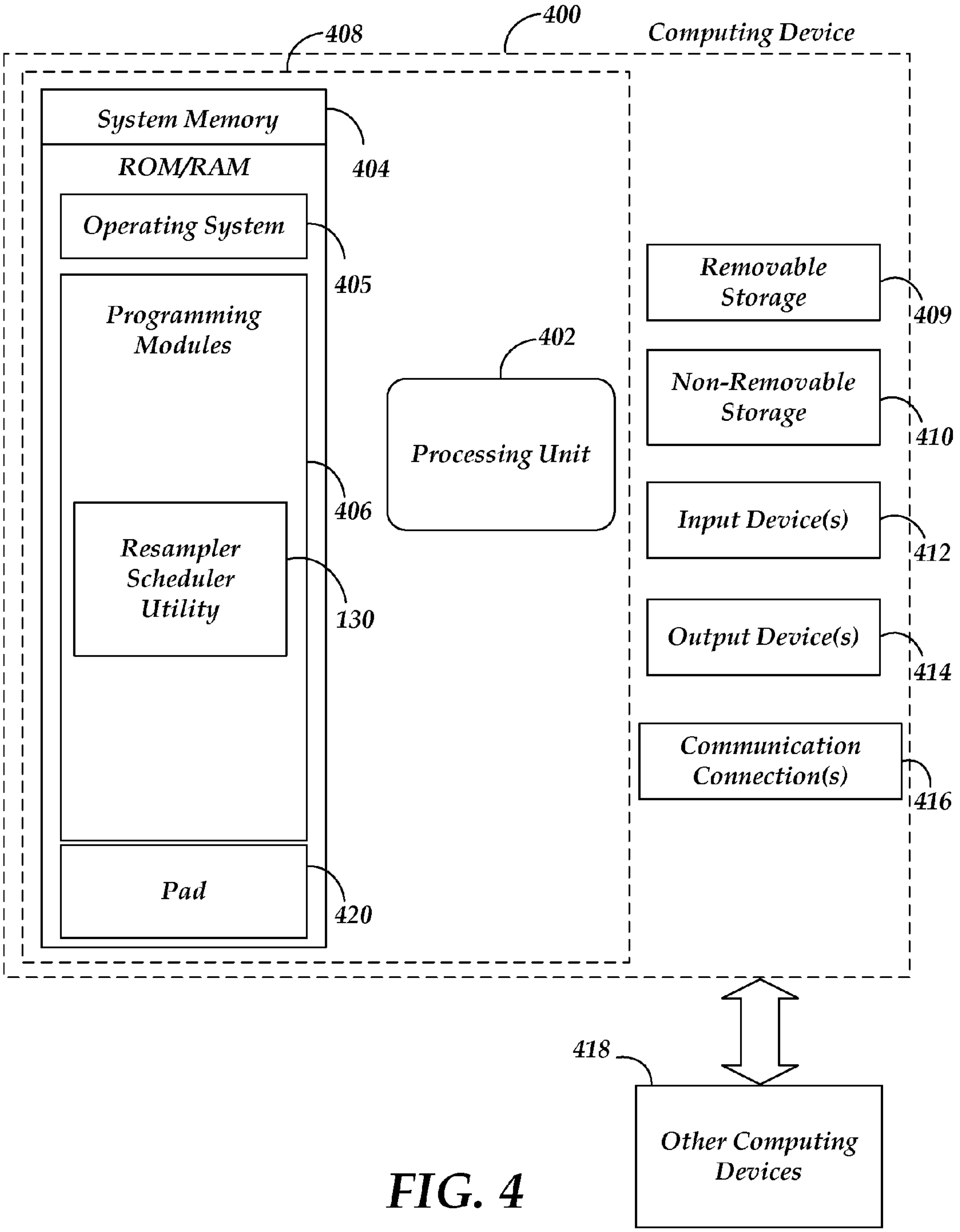
FIG. 4 is a block diagram of a system including a computing device.

FIG. 4 is a block diagram of a system including computing device 400. Consistent with an embodiment of the invention, the aforementioned memory storage and processing unit may be implemented in a computing device, such as computing device 400 of FIG. 4. Any suitable combination of hardware, software, or firmware may be used to implement the memory storage and processing unit. For example, the memory storage and processing unit may be implemented with computing device 400 or any of other computing devices 418, in combination with computing device 400. The aforementioned system, device, and processors are examples and other systems, devices, and processors may comprise the aforementioned memory storage and processing unit, consistent with embodiments of the invention. Furthermore, computing device 400 may comprise operating environment 100 as described above. Operating environment 100 is not limited to computing device 400.

With reference to FIG. 4, a system consistent with an embodiment of the invention may include a computing device, such as computing device 400. In a basic configuration, computing device 400 may include at least one processing unit 402 and a system memory 404. Depending on the configuration and type of computing device, system memory 404 may comprise, but is not limited to, volatile (e.g. random access memory (RAM)), non-volatile (e.g. read-only memory (ROM)), flash memory, or any combination. System memory 404 may include operating system 405, one or more programming modules 406, and may include resampler scheduler utility 130. Operating system 405, for example, may be suitable for controlling computing device 400's operation. In some embodiments, system memory 404 may comprise buffer pad 420. Furthermore, embodiments of the invention may be practiced in conjunction with a graphics library, other operating systems, or any other application program and is not limited to any particular application or system. This basic configuration is illustrated in FIG. 4 by those components within a dashed line 408.

Computing device 400 may have additional features or functionality. For example, computing device 400 may also include additional data storage devices (removable and/or non-removable) such as, for example, magnetic disks, optical disks, or tape. Such additional storage is illustrated in FIG. 4 by a removable storage 409 and a non-removable storage 410. Computing device 400 may also contain a communication connection 416 that may allow device 400 to communicate with other computing devices 418, such as over a network in a distributed computing environment, for example, an intranet or the Internet. Communication connection 416 is one example of communication media.

The term computer readable media as used herein may include computer storage media. Computer storage media may include volatile and nonvolatile, removable and non-removable media implemented in any method or technology for storage of information, such as computer readable instructions, data structures, program modules, or other data. System memory 404, removable storage 409, and non-removable storage 410 are all computer storage media examples (i.e memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 400. Any such computer storage media may be part of device 400. Computing device 400 may also have input device(s) 412 such as a keyboard, a mouse, a pen, a sound input device, a touch input device, etc. Output device(s) 414 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

As stated above, a number of program modules and data files may be stored in system memory 404, including operating system 405. While executing on processing unit 402, programming modules 406 (e.g. resampler scheduler utility 130) may perform processes including, for example, one or more of method 200's and/or method 300's stages as described above. The aforementioned process is an example, and processing unit 402 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for providing audio stream scheduling, the method comprising:
- receiving an audio frame from a producer;
- transmitting the audio frame to a consumer;
- calculating a delay between receiving the audio frame and transmitting the audio frame;
- determining whether the delay comprises a value within a threshold range comprising a percentage of said audio frame; and
- in response to determining that the delay comprises a value not within the threshold range, modifying the size of a subsequent audio frame prior to transmitting the subsequent frame to the consumer, wherein modifying the size of the subsequent audio frame comprises altering a size of a buffer associated with transmitting the subsequent audio frame.

2. The method of claim 1, wherein the audio frame is one of a plurality of audio frames received from the producer and wherein each audio frame is received from the producer according to a first clock tick associated with the producer.

3. The method of claim 2, further comprising receiving a request from the audio frame from the consumer, wherein the request for the audio frame is received from the consumer according to a second clock tick associated with the consumer.

4. The method of claim 3, wherein the audio frame comprises an amount of audio data associated with a time value.

5. The method of claim 4, wherein the second clock tick is scheduled to occur such that the delay comprises half the subsequent time value associated with the audio frame.

6. The method of claim 1, wherein determining whether the delay comprises the value not within the threshold range comprises determining whether the delay comprises a value greater than the threshold range.

7. The method of claim 6, further comprising:
- in response to determining that the delay comprises the value greater than the threshold range:
- removing a subset of data from the audio frame prior to transmitting the audio frame to the consumer; and
- storing the subset of data in a buffer pad.

8. The method of claim 7, further comprising:
- receiving a next audio frame from the producer;
- downsampling the next audio frame;
- adding at least a portion of the subset of data in the buffer pad to the downsampled next audio frame; and
- transmitting the downsampled next audio frame to the consumer.

9. The method of claim 1, wherein determining whether the delay comprises the value not within the threshold range comprises determining whether the delay comprises a value less than the threshold range.

10. The method of claim 9, further comprising:
- in response to determining that the delay comprises the value less than the threshold range:
- removing a subset of data from the audio frame and each of a plurality of subsequent frames;
- upsampling the audio frame and each of the plurality of subsequent frames;
- transmitting the upsampled audio frame and each of the plurality of subsequent frames to the consumer; and
- storing the removed subset of data in a buffer pad.

11. The method of claim 7, further comprising:
- receiving a next audio frame from the producer;
- adding the removed subset of data in the buffer pad to the next audio frame; and
- transmitting the next audio frame to the consumer.

12. A system scheduling, the system comprising:
- a memory storage; and
- a processing unit coupled to the memory storage, wherein the processing unit is operative to:
  - receive a first frame from a producer;
  - receive a second frame from the producer;
  - measure a time after receiving the first frame and at a start of receiving the second frame;
  - determine a target delay based on the measured time between the first frame and the second frame;

receive a frame request from a consumer;

determine whether the frame request occurred within a threshold range of the target delay from the time the second frame was received; and in response to determining that the frame request did not occur within the threshold range of the target delay:

modify a size of the first frame, and transmit the modified first frame to the consumer.

13. The system of claim 12, wherein the target delay comprises half of the first frame.

14. The system of claim 12, wherein the threshold range comprises ten percent of the first frame.

15. The system of claim 12, wherein determining whether the frame request occurred within the threshold range comprises determining whether the frame request occurred before the threshold range of the target delay.

16. The system of claim 15, further comprising:

in response to determining that the frame request occurred before the threshold range of the target delay, sending a portion of the first frame to the consumer.

17. The system of claim 16, wherein the portion of the first frame comprises an amount of data comprising the target delay minus an actual time between receiving the second frame and receiving the frame request.

18. The system of claim 12, wherein determining whether the frame request occurred within the threshold range comprises determining whether the frame request occurred after the threshold range of the target delay.

19. The system of claim 18, further comprising:

in response to determining that the frame request occurred after the threshold range of the target delay, sending the first frame and a portion of the second frame as a single frame to the consumer, wherein the single frame comprises an amount of data comprising a full frame plus the target delay minus an actual time between receiving the second frame and receiving the frame request.

20. A system for providing audio frame resampling and scheduling, the system comprising:

a memory storage; and a processing unit coupled to the memory storage, wherein the processing unit is operative to:

receive a first frame from a producer, receive a second frame from the producer, measure a time after receiving the first frame and at a start of receiving the second frame, establish a target delay equal to half the time between the first frame and the second frame, receive a frame request from a consumer, determine whether the frame request was received before a threshold range of the target delay from the time the second frame was received, in response to determining that the frame request was received before the threshold range of the target delay, send a portion of the first frame comprising a first amount of data comprising the target delay minus an actual time between receiving the second frame and receiving the frame request to the consumer, in response to determining that the frame request did not occur before the threshold range of the target delay, determine whether the frame request was received after the threshold range of the target delay from the time the second frame was received, in response to determining that the frame request was received after the threshold range of the target delay from the time the second frame was received, send the first frame and a portion of the second frame to the consumer as a single frame, wherein the single frame comprises a second amount of data comprising a full frame plus the target delay minus an actual time between receiving the second frame and receiving the frame request, receive a plurality of subsequent frames from the producer, receive a plurality of subsequent frame requests from the consumer, determine, for at least one of the plurality of subsequent frames, whether a corresponding one of the plurality of subsequent frame requests was received before the threshold range of the target delay from the time the corresponding frame was received, in response to determining that the corresponding one of the plurality of subsequent frame requests was received before the threshold range of the target delay:

remove a subset of data from the corresponding frame prior to transmitting the corresponding frame to the consumer, store the subset of data in a buffer pad, downsample at least one of the plurality of subsequent frames subsequent to the corresponding frame, and add at least a portion of the subset of data in the buffer pad to the downsampled frame, and send the downsampled frame to the consumer, in response to determining that the corresponding one of the plurality of subsequent frame requests was not received before the threshold range of the target delay, determine whether the corresponding one of the plurality of subsequent frame requests was received after the threshold range of the target delay from the time the corresponding frame was received, and in response to determining that the corresponding one of the plurality of subsequent frame requests was received after the threshold range of the target delay from the time the corresponding frame was received:

remove a second subset of data from the corresponding frame and each of a subset of the plurality of subsequent frames, upsample the corresponding frame and each of the subset of the plurality of subsequent frames, send the upsampled corresponding frame and each of the subset of the plurality of upsampled subsequent frames to the consumer, store the second subset of data in the buffer pad, receive a next subsequent frame from the producer, add the second subset of data from the buffer pad to the next subsequent frame, and send the next subsequent frame to the consumer.

* * * * *